(12) United States Patent
Ala-Luukko

(10) Patent No.: US 7,813,355 B2
(45) Date of Patent: *Oct. 12, 2010

(54) NETWORK-REQUESTED ACTIVATION OF PACKET DATA PROTOCOL CONTEXT

(76) Inventor: Sami Ala-Luukko, Paraistentie 18 A 2, Helsinki (FI) FIN-00280

( * ) Notice: Subject to any disclaimer, the term of this patent is extended or adjusted under 35 U.S.C. 154(b) by 517 days.

This patent is subject to a terminal disclaimer.

(21) Appl. No.: 11/511,741

(22) Filed: Aug. 28, 2006

(65) Prior Publication Data

US 2007/0053326 A1 Mar. 8, 2007

Related U.S. Application Data

(63) Continuation of application No. 10/294,390, filed on Nov. 14, 2002, now Pat. No. 7,203,200.

(30) Foreign Application Priority Data

May 15, 2000 (FI) ................... 20001161
May 14, 2001 (FI) ............ PCT/FI01/00468

(51) Int. Cl.
*H04L 12/28* (2006.01)
*H04L 12/56* (2006.01)

(52) U.S. Cl. .............. 370/401; 370/231; 370/235

(58) Field of Classification Search ............... 370/235, 370/229–231, 310, 389, 392, 401, 466–467
See application file for complete search history.

(56) References Cited

U.S. PATENT DOCUMENTS

| 6,167,445 | A | 12/2000 | Gai et al. |
| 6,505,047 | B1 | 1/2003 | Palkisto |
| 6,683,853 | B1 * | 1/2004 | Kannas et al. ............ 370/237 |
| 6,683,860 | B1 | 1/2004 | Forssell et al. |
| 6,690,679 | B1 | 2/2004 | Turunen et al. |
| 6,975,631 | B1 | 12/2005 | Kastenholz |
| 7,203,200 | B2 * | 4/2007 | Ala-Luukko ............ 370/401 |
| 2002/0032800 | A1 | 3/2002 | Puuskari et al. |

(Continued)

FOREIGN PATENT DOCUMENTS

WO WO 99/05828 A1 2/1999

(Continued)

OTHER PUBLICATIONS

International Search Report issued on Sep. 4, 2001 for application No. PCT/FI01/00468.

*Primary Examiner*—Ronald Abelson
(74) *Attorney, Agent, or Firm*—Foley & Lardner LLP

(57) ABSTRACT

A method for activating a packet data protocol context in a wireless telecommunication system comprising at least one terminal and at least one network element. The network element is arranged to deliver packets between the wireless telecommunication system and other packet data networks. Direction-specific service conditions are stored in the telecommunication system for packets received by the network element and designated to at least one terminal. The stored direction-specific service conditions determine what kind of service is provided for packets received from different directions. The direction of a received packet is determined and the direction-specific service conditions relating to the determined direction of the packet are checked. The packet data protocol context is activated according to the direction-specific service conditions.

24 Claims, 2 Drawing Sheets

U.S. PATENT DOCUMENTS

| | | |
|---|---|---|
| 2002/0080757 A1* | 6/2002 | Narvanen et al. ........... 370/338 |
| 2003/0112793 A1* | 6/2003 | Sengodan .................... 370/352 |
| 2004/0198365 A1* | 10/2004 | Verma et al. ............. 455/452.1 |
| 2005/0047337 A1* | 3/2005 | Virtanen .................... 370/229 |

FOREIGN PATENT DOCUMENTS

| | | |
|---|---|---|
| WO | WO 99/48310 A1 | 9/1999 |
| WO | WO 99/66746 | 12/1999 |
| WO | WO 00/21310 A1 | 4/2000 |
| WO | WO 00/78066 | 12/2000 |
| WO | WO 00/78080 | 12/2000 |
| WO | WO 01/15463 | 3/2001 |

* cited by examiner

NETWORK-REQUESTED ACTIVATION OF PACKET DATA PROTOCOL CONTEXT

CROSS-REFERENCE TO RELATED APPLICATIONS

This application is a continuation of U.S. patent application Ser. No. 10/294,390 filed Nov. 14, 2002, now U.S. Pat. No. 7,203,200 which is the National Stage Application of International Application No. PCT/FI01/00468 filed May 14, 2001, which claims priority to Finland Patent Application No. 20001161 filed May 15, 2000. Both the '390 and the '468 patent applications identified immediately above are incorporated herein by reference in their entirety.

BACKGROUND OF THE INVENTION

The invention relates to packet data protocol context activation, and more particularly to network-requested packet data protocol context activation.

In the recent years, as services based on the Internet in particular have become increasingly popular, mobile communication systems have been provided with networks for packet-switched data. A General Packet Radio System (GPRS) has been developed for a Global System for Mobile Communications (GSM) to provide GSM mobile stations with a packet-switched data transmission service. Network elements based on the GPRS system will also be applied to a third generation Universal Mobile Telecommunications System (UMTS).

A GPRS network comprises a Gateway GPRS Support Node (GGSN) and a Serving GPRS Support Node (SGSN). The SGSN is responsible for detecting mobile stations capable of GPRS connections in its area, transmitting and receiving data packets to and from the mobile stations, and for monitoring the location of the mobile stations in its service area. The gateway support node GGSN serves as a gateway between the GPRS network and an external Packet Data Network (PDN). The gateway support node GGSN communicates with the data networks through an interface called Gi. Subscriber information is stored in a Home Location Register (HLR).

In order to be able to access GPRS services, a terminal must first make its presence known to the network by carrying out a GPRS attach procedure. This procedure forms a logical link between the terminal and the SGSN, making the mobile station accessible for short message transmission taking place over the GPRS, for paging taking place through the SGSN and for indicating incoming GPRS data. To be more precise, when the terminal MS registers for (attaches to) the GPRS network, i.e. during the GPRS attach procedure, the SGSN creates a Mobility Management (MM) context. User authentication is also carried out by the SGSN in the GPRS attach procedure. In order to transmit or receive GPRS data, the terminal must activate a packet data address it wishes to use by requesting the network to activate a GPRS packet data protocol context, which henceforth will be called a PDP (Packet Data Protocol) context. In connection with the present application, without being restricted to the GPRS system, the term packet data protocol context, or PDP context, refers to any logical connection established in order to transmit packet switched data between a terminal and a network element responsible for the connection, such as a gateway support node.

PDP context activation in the GPRS system makes the terminal known in a corresponding GGSN node, enabling cooperation with external data networks. To be more precise, the PDP context is created at the terminal, in the GGSN and SGSN nodes. The PDP context specifies different data transmission parameters, such as the PDP type (e.g. X.25 or IP), PDP address (e.g. X.121 address), Quality of Service (QoS) and Network Service Access Point Identifier (NSAPI).

The GPRS standard specifies that a network-requested PDP context activation can be actuated. This feature enables the PDP context to be activated from the network. Such a need may arise e.g. when using a so-called push service. The idea underlying a push service is that a subscriber has in advance agreed with a service provider that he or she will automatically, without any separate request, be sent data, e.g. information on stock exchange prices of the day. Also in different telemetric services, the network typically transmits data to a mobile station at long intervals, in which case it is not reasonable to continuously maintain a PDP context, and using a PDP context activated from the network could be an alternative.

The problem with the above-described system is that in principle any one connected to the Internet is able to transmit packets to the GPRS subscriber. Typically, a GPRS subscriber also pays for received packets, which means that the GPRS subscriber may have to pay for packets he or she never wanted.

BRIEF DESCRIPTION OF THE INVENTION

An object of the invention is thus to provide a method and an apparatus implementing the method so as to enable packet data protocol context activation requested from a network for received packets to be restricted. The objects of the invention are achieved by a method and a network part which are characterized by what has been disclosed in the independent claims. Preferred embodiments of the invention are disclosed in the dependent claims.

The invention is based on determining service conditions according to which PDP context activation can be requested from a network. A packet data protocol context is activated (or the activation of a packet data protocol context is prevented) according to the service conditions. PDP context activation can then only be requested for packets the service conditions allow to be delivered to a terminal. According to an aspect of the invention, the service conditions can be determined direction-specifically. When direction-specific service conditions are used, the direction of a received packet is determined and the direction-specific service conditions are checked. Hence, a packet data protocol context can only be activated for packets received from allowed directions, or, correspondingly, packets received from prohibited directions can be denied PDP context activation. The direction of a packet may be determined e.g. on the basis of the source of the packet, route used by the packet, previous node or a combination of the above criteria. The advantage achieved is that packets supplied to a terminal from unwanted directions can be prevented from being delivered, thus enabling extra costs to be avoided.

According to a second aspect of the invention, the service conditions can be determined service-type-specifically. A service type is determined according to the features of a packet, typically determining the application the packet is associated with. The advantage achieved is that it becomes possible to treat different type of data associated with different applications in a different manner. Consequently, for instance a certain application, e.g. a messaging service, can be allowed to request PDP context activation.

According to a preferred embodiment of the invention, the service conditions are stored subscriber-specifically, which means that different subscribers may have different service conditions. Service providers thus have better opportunities to differentiate the service provision for different customers. This also enables the subscriber to determine the directions the packets should be received from and/or the service types the packets should be associated with so that he or she would be willing to pay for them.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

The invention can be applied to any wireless network providing packet data transmission wherein the network can request packet data protocol context activation.

Figure 2:
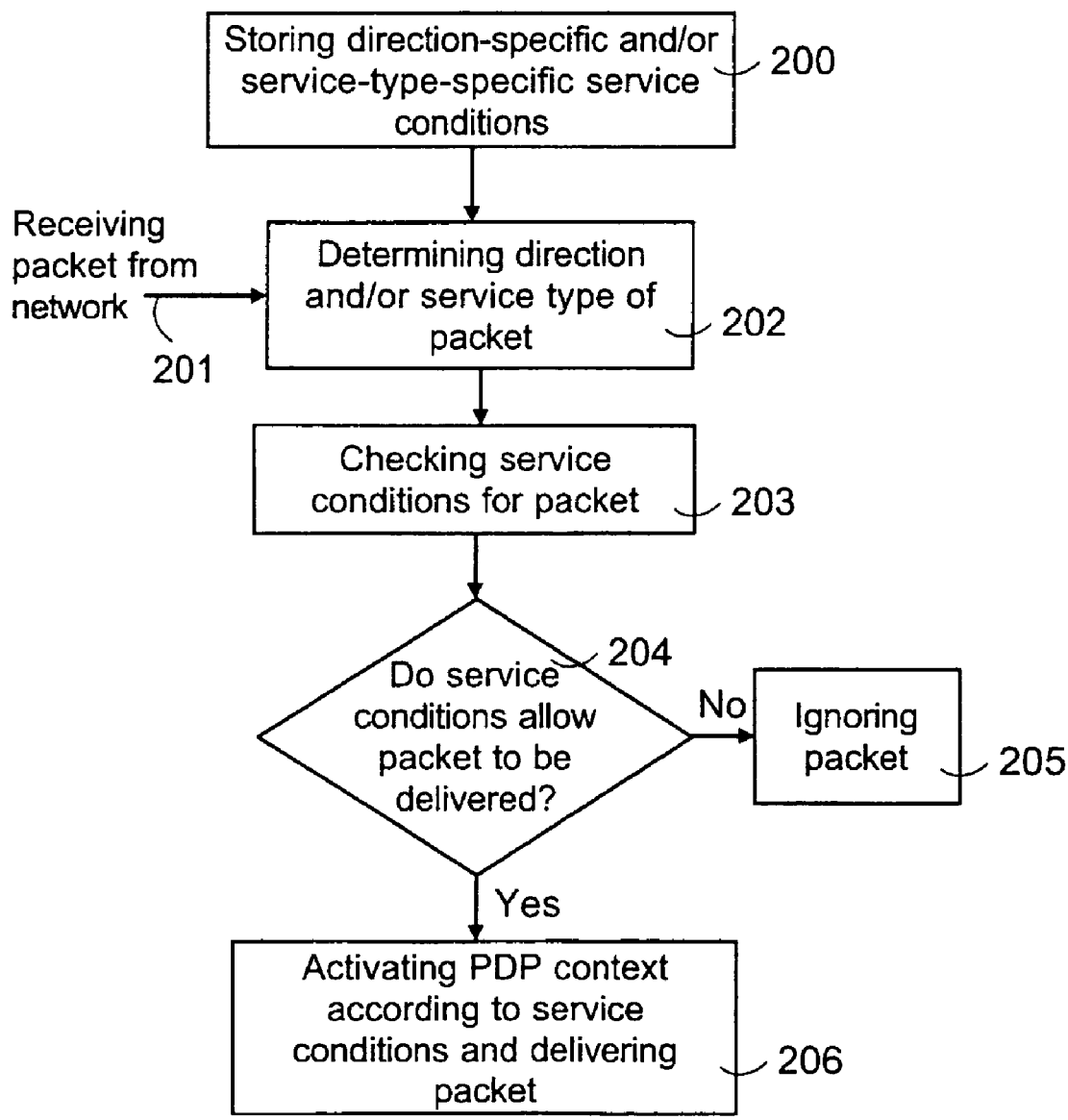
FIG. 2 shows packets being delivered from a network according to a preferred embodiment.

By way of example, FIG. 2 shows a wireless telecommunication system according to GSM/GPRS technology. A wireless mobile station MS comprises two functional parts: mobile equipment ME itself and a subscriber identity module SIM, which is typically located on an integrated circuit card IC. Base transceiver stations BTS provide the mobile stations with wireless connections, and the radio frequencies and channels used by the base transceiver stations are controlled by base station controllers BSC.

For circuit-switched services, the base transceiver stations BSC are connected to a mobile services switching centre MSC/VLR, which is responsible for connection setup for the circuit-switched services and for routing such services to correct addresses. Two databases comprising information on mobile subscribers are utilized: a home location register HLR and a visitor location register VLR. Typically, the visitor location register VLR is implemented as a part of the mobile services switching centre MSC/VLR.

Figure 1:
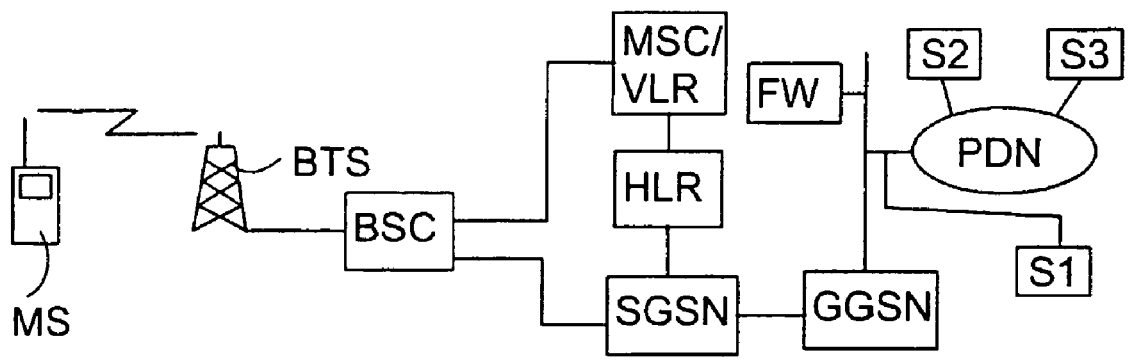
FIG. 1 shows a wireless telecommunication system according to GPRS technology.

The SGSN and the GGSN are responsible for packet-switched services. The SGSNs and the GGSNs are interconnected through a backbone network, which is typically based on an IP protocol. The home location register HLR in the GSM network comprises GPRS subscriber information and routing information. External packet data networks PDN may include e.g. a GPRS network of another network operator, the Internet, an X.25 network or a private local area network. A border gateway BG provides access to a GPRS backbone network between operators. As far as the external data networks PDN are concerned, the GGSN is a router to a subnetwork since the GGSN hides the GPRS functionality. In the example of FIG. 1, a server S1 can be directly connected to the GPRS network and servers S2 and S3 can be connected to the GPRS network through an external data network PDN, such as the common Internet. FIG. 1 also shows a firewall FW functionally connected to the GGSN to enable unauthorized access to the GPRS network to be prevented.

For a more detailed description of the GSM/GPRS networks, reference is made to the GPRS specifications issued by ETSI (European Telecommunications Standards Institute), and to *The GSM System for Mobile Communications* by M. Mouly and M. Pautet, Palaiseau, France, 1992, ISBN: 2-9507190-0-0-7.

According to a preferred embodiment, network-requested PDP context activation is determined in the GPRS network on the basis of the directions of received packets and/or service requests contained in such packets. The GGSN may comprise a functionality to be described in the following for checking the information on the packets and for activating a PDP context only for packets meeting predetermined conditions.

Preferably, the service conditions determining what kind of service will be provided for received packets are stored 200 in the GGSN. The service conditions may be direction-specific, which means that they determine a service that can be provided for a packet received from a certain direction. The service conditions can also be stored in another network element, such as in the subscriber database HLR.

When the GGSN receives 201 a packet designated to the mobile station MS from an external network, the GGSN can determine 202 the direction from which the packet to be delivered to the mobile station MS was received. From the stored service conditions, the GGSN checks 203 the delivery conditions relating to the direction of the packet. It can be checked 204 from the service conditions whether the packet received from the determined direction (virtual and/or physical) is allowed to be delivered to the mobile station MS. If not, the packet is ignored 205. If the service conditions allow the packet to be delivered from the determined direction, the GGSN can request 206 PDP context activation for one or more mobile stations MS. If possible, the PDP context is activated and the packet can be delivered to the MS, utilizing the activated PDP context. It should be noted that the GPRS network typically also user-specifically checks in step 206 whether it is possible to activate the PDP context. The PDP context cannot thus necessarily always be activated even if allowed by the service conditions.

The great advantage achieved is that the GPRS network enables conditions to be determined for PDP context activation from the network and, if necessary, PDP context activation to be denied to packets received from non-reliable directions.

Network-requested PDP context activation can be determined according to direction-specific service conditions on the basis of the physical and/or logical direction of the packets. A physical direction is determined on the basis of the physical data transmission device, e.g. on the basis of a fixed line. Packets received from the same physical direction (e.g. from a cable of a router) may have different logical directions. If the packets are encrypted such that the GGSN is able to find out the sender that carried out the encryption, the packets received from the same physical direction can be treated in different ways on the basis of the sender. The logical direction of the packets can be determined e.g. on the basis of the termination point that carried out tunnelling, which means that the network elements therebetween are incapable of detunnelling.

According to a preferred embodiment, the stored direction-specific service conditions comprise information on allowed nodes. The support node then, in step 202, determines the node from which a received packet was transmitted. The support node activates (206) the packet data protocol context for the mobile station MS if the stored service conditions allow packets to be transmitted from the determined node to the mobile station. The advantage is that requesting PDP context activation can only be allowed for packets received from reliable network elements. A GPRS network operator can then e.g. only allow packets received from a server (S1) in its own network or packets received through a border gateway from another GPRS network to be delivered.

An alternative is to determine an address space in the direction-specific service conditions, wherein PDP context activation is allowed for packets delivered from addresses belonging to the address space. The GGSN then determines the source address to the received packet unit and whether the source address of the received packet unit belongs to the stored address space. The GGSN activates the PDP context if the received packet belongs to the address space. The direction-specific service conditions may also require that only packets tunnelled and encrypted at certain source addresses can be delivered to the MS. For instance, different tunnelling techniques of VPN (Virtual Private Network) tunnelling can be used.

It is also feasible to determine service-specific service conditions. Particularly, service types can be determined such that packets according to the particular service types are allowed to be delivered, i.e. the GGSN can request PDP context activation for such packets. The service-type-specific service conditions are then preferably stored 200 in the GGSN. Typically, a service type is the application type associated with a packet, i.e. the service type determines the application with which the packet is associated. The service-type-specific service conditions determine what kind of service will be provided for the received packets associated with different service types and designated to the mobile station MS. The service type associated with the packet designated to the mobile station is determined 202 from the packet received 201 by the GGSN. The delivery conditions associated with the service type of the packet are checked 203 from the stored service conditions. If the service conditions allow the packet to be delivered, the packet data protocol context can be activated 206 according to the service-type-specific service conditions.

The service types can preferably be determined according to applications determinable from the packet. The GGSN can then determine the port number contained in the packet and request PDP context activation on the basis of the service conditions according to the determined port number. Consequently, only packets comprising a desired port number can thus be allowed to be delivered. The service conditions may e.g. determine that PDP context activation can be requested for packets associated with an application according to an HTTP (Hypertext Transfer Protocol) protocol. The service conditions can then determine that PDP context activation is allowed for packets comprising port number 80 (number 80 is typically used for identifying an HTTP application). The GGSN determines the port numbers of the packets, being then allowed to request PDP context activation for packets according to port number 80.

According to a preferred embodiment, the service conditions are stored subscriber-specifically, i.e. the service conditions can preferably be stored for different subscribers on the basis of an IMSI identifier. Hence, the allowed directions and/or service types can be determined in a particularly individual manner, enabling the subscriber to affect the service conditions. Furthermore, subscriber-group-specific service conditions can be determined. In such a case, in addition to finding out the direction and/or service type of a packet, the GGSN also finds out the IMSI identifier of the receiver of the packets on the basis of the subscriber information in the network. From the subscriber-specific service conditions, the GGSN checks what kind of service can be provided for the received packets. Particularly, it is found out whether the service conditions allow the packet to be delivered. The subscriber can then decide on the directions the packets should be received from and/or the service types the packets should be associated with so that he or she would be willing to pay for them. It is also feasible that the subscriber-specific service conditions deny PDP context activation to a certain subscriber for packets received from the network, entirely regardless of the direction they are received from or the service type they are associated with.

According to a preferred embodiment, in addition to the conditions relating to allowing packets to be delivered, the direction- and/or service-type-specific service conditions can also determine other conditions. The service conditions may determine e.g. the PDP type allowed, information on the QoS (Quality of Service) allowed or other such information concerning the PDP context. The information can also be information relating to other aspects of service provision, such as charging information. This information can be tied to the direction and/or service type of a packet, i.e. a different PDP context can be activated for packets received from different directions and/or packets of different service types, according to the stored service conditions. This enables a convenient way of determining different service provision for packets received from different directions and/or having different service types. For instance, the subscriber could be charged differently for packets received from different directions. If the information is information relating to charging, instructions for carrying out the charging must be delivered to a GPRS charging centre, which charges for the delivered packets/PDP context accordingly. If the service condition is a service condition relating to a PDP context type and/or quality of service, the GGSN can request PDP context activation for an accepted packet by applying type and/or quality parameters according to the service condition.

The functionality described above in connection with FIG. 2 can also readily be implemented at another network element than the GGSN. For example, the firewall FW functionally connected to the GGSN can be arranged to implement the above-described checking procedures (200 to 204) regarding the direction and/or service type of packets and to deliver a packet to the GGSN if the service conditions allow the packet to be delivered. Next, the GGSN may carry out network-requested PDP context activation according to the prior art known per se.

The invention can preferably be implemented by software means in a processor of a network element in a wireless telecommunication system. Preferably, the network element is the gateway support node GGSN or the firewall FW functionally connected to the GGSN. The network element preferably comprises one or more processors, a bus for communicating with other devices and a memory to store service conditions by means of the processor and the bus. If the invention is implemented by software, the processor executes the software stored in the memory which carries out the steps illustrated in FIG. 2 each time the network element receives packets from the external networks PDN. It is also feasible that the service conditions are stored in another network element, such as the subscriber register HLR, in which case the network element comprising the inventive functionality retrieves the service conditions from the other network element.

Figure 3:
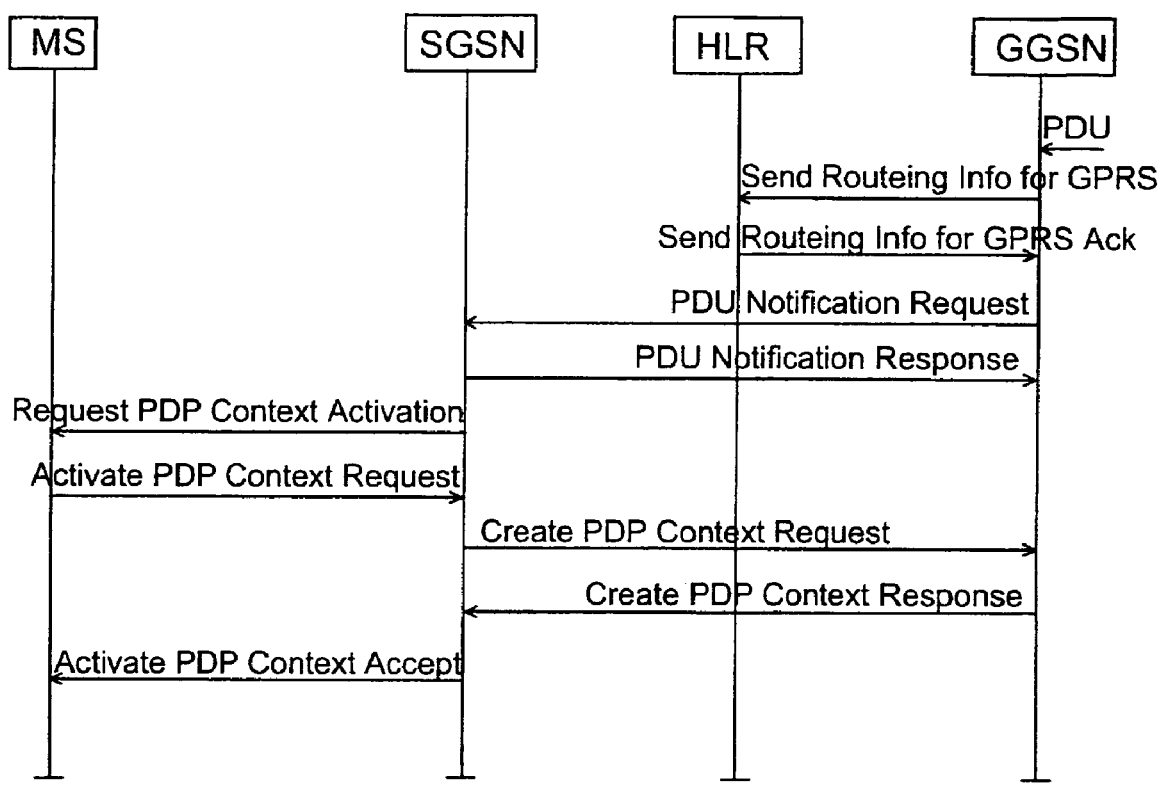
FIG. 3 shows PDP context activation.

FIG. 3 illustrates network-requested PDP context activation. It is assumed that packets designated to the MS are received from outside the GPRS network and that the mobile station MS is known in the GPRS network, i.e. the MS has performed a GPRS attach procedure. A PDP context is created and the packets are tunnelled using a GTP (GPRS Tunnelling Protocol) protocol. The GGSN may request PDP context activation if the service conditions allow a received packet to be delivered to the mobile station MS (step 206 in FIG. 2). The GGSN may request routing information from the network element comprising the home location register HLR (Send Routeing Info for GPRS). If the network element comprising the HLR decides that the service request can be implemented for the mobile station MS, it replies to the request issued by the GGSN (Send Routeing Info for GPRS Ack). If the address of the correct serving node SGSN can be found in the reply received from the HLR and the mobile station MS can be accessed, the GGSN informs the SGSN of the received data (PDU Notification Request). Such a message comprises an IMSI identifier to identify the subscriber, information on the PDP type and PDP address. The SGSN transmits an acknowledgement to the GGSN if it is going to ask the mobile station MS to activate the PDP context (PDU Notification Response). The SGSN transmits a PDP context activation request to the mobile station MS (Request PDP Context Activation).

In response to the request, the MS delivers the PDP context activation request to the SGSN (Activate PDP Context Request). At this stage, security procedures, such as authentication, between the mobile station MS and the SGSN can be carried out. If the mobile station MS has the right to activate the PDP address, the SGSN can create the PDP context for the mobile station MS. In order to map the PDP context into the GPRS network mobility management, the SGSN creates a TID (Tunnel Identifier, which is used in the GPRS tunnelling protocol between the network elements in order to identify the PDP context) for the requested PDP context on the basis of the IMSI identifier and the NSAPI (Network layer Service Access Point Identifier) received from the mobile station MS. The PDP context activation request is delivered to the GGSN (Create PDP Context Request). The SGSN stores the IP address of the GGSN (which can be modified from the logical name) in connection with the requested PDP context (GGSN Address in Use) and uses the address as long as the PDP context exists.

If the GGSN can accept the PDP context activation request, the PDP context activation can be completed. The GGSN adds a new context to a PDP context table and produces a charging identifier. The GGSN may also deliver a message to the SGSN to indicate the PDP context activation (Create PDP Context Response). In response to this, the SGSN adds an NSAPI identifier to the address of the GGSN. The SGSN further informs the mobile station MS of the PDP context activation (Activate PDP Context Accept). Subsequently, packets from reliable directions and/or packets provided with accepted service requests can be delivered to the mobile station MS according to the service conditions.

The invention can also readily be applied to wireless telecommunication systems other than the GSM systems. The so-called third generation wireless telecommunication systems, such as the UMTS (Universal Mobile Telecommunications System) or IMT-2000, for example, can support PDP context activation requested by the network, which enables procedures illustrated in FIG. 2 to be utilized. The packet-switched data transmission in the UMTS system will be mainly similar to the GPRS system in the GSM, so the invention is also readily applicable to the UMTS system. Furthermore, other wireless telecommunication systems to which the invention can be applied include e.g. wireless local area networks WLAN.

It is obvious to one skilled in the art that as technology advances, the basic idea of the invention can be implemented in many different ways. The invention and its embodiments are thus not restricted to the above-described examples but they may vary within the scope of the claims.

The invention claimed is:

1. A method for processing data packets, the method comprising:

receiving a data packet, wherein the data packet is directed toward a mobile terminal;
identifying a characteristic of the received data packet;
determining whether the identified characteristic of the data packet satisfies a condition associated with the mobile terminal; and
activating a packet data protocol context if the identified characteristic satisfies the condition.

2. The method of claim 1, further comprising denying activation of the packet data protocol context if the identified characteristic does not satisfy the condition.

3. The method of claim 1, wherein the identified characteristic comprises a source node of the data packet, and further wherein the condition comprises a source node-related service condition.

4. The method of claim 1, wherein the identified characteristic comprises a route used by the data packet, and further wherein the condition comprises a route-related service condition.

5. The method of claim 1, further comprising receiving the condition from a subscriber associated with the mobile terminal.

6. The method of claim 1, wherein the identified characteristic comprises a source address of the data packet, and further wherein the condition comprises a source address-related service condition.

7. The method of claim 6, wherein the source address-related service condition is based at least in part on an address space with one or more acceptable source addresses.

8. The method of claim 1, wherein the identified characteristic comprises an application associated with the data packet, and further wherein the condition comprises an application-related service condition.

9. The method of claim 1, further comprising determining one or more of a type of quality of service (QoS), a type of packet data protocol, and a charge based at least in part on the identified characteristic.

10. The method of claim 9, wherein the one or more of the type of quality of service, the type of packet data protocol, and the charge are determined based at least in part on the condition.

11. The method of claim 1, wherein the identified characteristic comprises a node from which the data packet is received, and further wherein the condition comprises a node-related service condition.

12. The method of claim 1, further comprising transmitting the data packet to the mobile terminal using the packet data protocol context if the packet data protocol context is activated.

13. A network element comprising:
a receiver configured to receive a data packet, wherein the data packet is directed toward a mobile terminal; and
a computing device operatively coupled to the receiver, wherein the computing device is configured to execute instructions to cause the computing device to perform operations comprising:
identifying a characteristic of the received data packet;
determining whether the identified characteristic of the received data packet satisfies a condition; and
activating a packet data protocol context if the identified characteristic satisfies the condition.

14. The network element of claim 13, further comprising a memory operatively coupled to the computing device, wherein the memory is configured to store the condition.

15. The network element of claim 13, wherein the identified characteristic comprises a source node of the data packet, a route used by the data packet, a source address of the data packet, an application associated with the data packet, or a node from which the data packet is received.

16. The network element of claim 13, wherein the condition relates to one or more of a source node of the data packet, a route used by the data packet, a source address of the data packet, an application associated with the data packet, and a node from which the data packet is received.

17. The network element of claim 13, wherein the operations further comprise ignoring the data packet if the identified characteristic does not satisfy the condition.

18. The network element of claim 13, wherein the condition is specific to the mobile terminal.

19. The network element of claim 13, further comprising a transmitter configured to transmit the data packet to the mobile terminal if the packet data protocol context is activated.

20. An article of manufacture including a computer-readable medium having instructions stored thereon that, if executed by a computing device, cause the computing device to perform operations comprising:

identifying a characteristic of a received data packet, wherein the data packet is directed toward a mobile terminal;

determining whether the identified characteristic of the data packet satisfies a condition associated with the mobile terminal; and activating a packet data protocol context if the identified characteristic satisfies the condition.

21. The article of manufacture of claim 20, wherein the condition comprises one of a direction-specific service condition or a service-type service condition.

22. The article of manufacture of claim 20, wherein the identified characteristic comprises a direction.

23. The article of manufacture of claim 20, wherein the identified characteristic comprises a port number associated with the data packet.

24. The article of manufacture of claim 20, wherein the operations further comprise ignoring the data packet if the identified characteristic fails to satisfy the condition.

\* \* \* \* \*